United States Patent
Lacombe

(10) Patent No.: US 6,496,317 B2
(45) Date of Patent: *Dec. 17, 2002

(54) ACCURATE ADJUSTABLE CURRENT OVERSHOOT CIRCUIT

(75) Inventor: David K. Lacombe, Mission Viejo, CA (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/307,296

(22) Filed: May 7, 1999

(65) Prior Publication Data

US 2001/0022700 A1 Sep. 20, 2001

(51) Int. Cl.[7] ............................... G11B 5/02; G11B 5/09
(52) U.S. Cl. .......................................... 360/68; 360/46
(58) Field of Search ..................................... 360/46, 68

(56) References Cited

U.S. PATENT DOCUMENTS

| 5,132,852 A | * | 7/1992 | Price, Jr. ...................... 360/46 |
| 5,287,231 A | | 2/1994 | Shier et al. .................... 360/68 |
| 5,291,347 A | | 3/1994 | Ngo et al. ..................... 360/68 |
| 5,296,975 A | | 3/1994 | Contreras et al. ............. 360/46 |
| 5,386,328 A | | 1/1995 | Chiou et al. ................... 360/68 |
| 5,612,828 A | | 3/1997 | Brannon et al. ............... 360/46 |
| 5,638,012 A | | 6/1997 | Hashimoto et al. ........... 360/46 |
| 5,770,946 A | | 6/1998 | Patterson ..................... 324/752 |
| 5,781,046 A | * | 7/1998 | Ngo et al. ..................... 360/68 |
| 5,822,141 A | | 10/1998 | Chung et al. ................. 360/46 |

* cited by examiner

Primary Examiner—Regina N. Holder
(74) Attorney, Agent, or Firm—W. Daniel Swayze, Jr.; W. James Brady; Frederick J. Telecky, Jr.

(57) ABSTRACT

A write driver controls current path for current of an H-bridge circuit. The H-bridge circuit is controlled by a differential pair switch for adjusting a voltage between the differential pair switch between a first voltage when the H-bridge circuit is switched and a second voltage after the H-bridge circuit is switched.

9 Claims, 5 Drawing Sheets

ACCURATE ADJUSTABLE CURRENT OVERSHOOT CIRCUIT

FIELD OF THE INVENTION

The present invention relates to write drivers for an inductive head in a magnetic data storage system and more particularly to write drivers that include an accurate adjustable current overshoot circuit.

BACKGROUND OF THE INVENTION

Conventional storage systems include an inductive coil to write information onto a recording surface of the magnetic medium, such as a magnetic disk. The inductive coil writes information by creating a changing magnetic field near the magnetic medium. A write driver circuit is connected to the inductive coil at two terminals. During writing operations, the write driver circuit forces a relatively large current through the inductive coil to create a magnetic field that polarizes adjacent bit positions on the recording surface. Digital information is stored by reversing the polarization of selected bit positions which is done by reversing the direction of the current flow in the inductive coil.

The typical write driver circuit includes an "H-bridge" for controlling the direction of current flow through the inductive coil. The H-bridge includes upper "pull-up" bi-polar transistors and lower "pull-down" bi-polar transistors. The upper bipolar transistors are connected between a first supply voltage and the inductive coil terminals. The lower bipolar transistors are connected between another set of inductive coil terminals and a second supply voltage through a write current sink. The write driver circuit controls the direction of flow through the inductive coil by driving selected transistors in the H-switch between ON and OFF states, thereby applying a limited voltage swing across the inductive coil to reverse the coil's current flow and to polarize the adjacent bit position on the magnetic medium.

The rate at which information can be stored on a recording surface through an inductive head is directly proportional to the rate at which the direction of current can be reversed in the inductive coil. The rise/fall time of the inductive coil is determined by:

$$di/dt = V/L$$

where di/dt is the rate of change of the current over time through the inductive coil, V is the available voltage across the inductive coil, and L is the inductive load. Therefore, the rate of current change through the coil is directly proportional to the available voltage across the inductive coil. The available voltage is determined by subtracting the voltage drops across the H-bridge pull-up transistors, the pull-down transistors, and the write current sink from the supply voltage.

In addition to the rate of current change through the coil, there are other coil current attributes that will affect how magnetic transitions are written to the medium. Some important coil current characteristics are shown in FIG. 6. In particular, the current's rise time (rate of change), overshoot, undershoot, and settling time are of interest. The desired characteristics for the coil current are a fast rise time and settling time, a controllable amount of overshoot, and very little undershoot.

Of particular interest is the write current overshoot. This is the amount of current that exceeds a desired or steady state value. The write current overshoot characteristic affects how magnetic transitions are written to the disk. Too much overshoot or too little may not optimize magnetic field transitions on the magnetic media. For example, too much write current overshoot may affect magnetic transitions written on adjacent tracks, or a small overshoot may not produce the fastest magnetic transition. A circuit is required that can accurately adjust and control the amount of write current overshoot.

In FIG. 3, transistor 330, transistor 332, transistor 334, and transistor 336 form an H-bridge switch. The coil 338 is activated by current flowing through it that forms magnetic transitions on the disk. The current through the coil 338 can be switched in either direction by turning off or on the appropriate transistors. When transistor 336 and transistor 332 are turned on, current will flow through coil 338 from node 340 to node 342. Under this situation, transistor 334 and transistor 330 are turned off. To change the direction of the current through the coil from node 342 to node 340, transistor 336 and transistor 332 are turned off, and transistor 334 and transistor 330 are turned on. These transistors are controlled by write data signals, namely WHX, WHY, WLX and to WLY. The steady state coil current is determined by the write current mirror circuit 300. The write current mirror circuit 300 includes transistor 312, resistor 316, transistor 304, FET 308, capacitor 310, transistor 314, and resistor 318. A voltage at node 340 is dependent on the current IW. This current IW is adjustable, and consequently, the voltage at node 340 is adjustable. Node 340 is connected to NFET 320, which is connected to node 342. Likewise, node 340 is connected to NFET 322, which is in turn connected to node 344. The NFET 320 and NFET 322 are switches and are complementary in that only one NFET (either NFET 320 or NFET 322) is on at any one time. When NFET 320 is turned on, the voltage at node 340 is approximately the same as at node 342, the transistor 330 is turned on by the voltage at node 342, and the current $I_{COIL}$ flows through resistor 346. The coil current $I_{COIL}$ is the amplified current of the master current IW. The typical gain is approximately 20.

The emitter size ratio of transistors 330, 332, and 312 and the resistor size ratio of resistors 316 and 346 determine the gain of the circuit from the write current mirror circuit 300. The coil current is an amplified current of the master current IW. When the NFET 320 is turned on and the NFET 322 is off, the voltage at node 340 is approximately the voltage at node 342. Therefore, transistor 330 is on, and transistor 332 is off. At the same time that NFET 320 turns on, the signal WHY turns on transistor 334 and signal WHX turns off transistor 336. The circuitry that controls transistor 336 and transistor 334 is not shown. Of interest with the present invention is the lower H-bridge transistors, namely transistors 330 and 332.

Typically, NFET 320 and NFET 322 are very large, so consequently, the impedance between nodes 340 and 342 or node 344 is minimized. A small impedance will turn transistor 330 and transistor 332 on faster; however, the gate to drain and source capacitance is high. When either NFET 320 or NFET 322 is turned on, the gate voltage goes high, dumping charge into the base of transistor 330 or transistor 332 through the NFET's parasitic capacitance. This extra "boost" of charge is amplified by transistor 330 or transistor 332 and results in excessive coil current overshoot. Furthermore, the NFET switches, namely NFET 320 and NFET 322, are not controlled by differential signals. Thus, the timing of the gate voltage is dependent on circuit layout. An asymmetric layout of signals WLX and WLY to NFET 320 or NFET 322 could cause NFET 320 and NFET 322 to turn on or off uncomplementary. As a result, the load seen by the write current mirror circuit, particularly at node 340, will change, resulting in the voltage at node 340 changing. The compensation due to capacitor 310 of the write current mirror circuit 300 is important. If the circuit 300 is not well compensated, the voltage at node 340 will change which results in an undesirable current response. Typically, the current through the coil 338 is a multiple of the master current IW with a typical gain of 1–20. Signals WLX and WLY are CMOS level signals to control NFET 320 and NFET 322. Since the signals are not completely differential, this leads to asymmetrical switching between NFET 320 and NFET 322.

SUMMARY OF THE INVENTION

The write circuit of the present invention accurately controls the current through the coil that is used to write data to the magnetic medium.

The write circuit of the present invention reduces write current overshoot when write current overshoot is not desired.

The write circuit of the present invention provides the ability to accurately adjust the amount and duration of the coil current overshoot over a wide range of write current settings and overshoot current settings.

The circuit of the present invention controls the overshoot such that the overshoot current amplitude is very insensitive to process, voltage, and temperature changes of the circuit. The write driver of the present invention has an overshoot circuit which requires few additional components. Furthermore, the overshoot circuit requires little additional power dissipation because the overshoot current is controlled at the base of the lower transistors of the H-bridge circuit.

The overshoot circuit includes a delayed write data signal (WBX, WBY) rather than a pulse. Creating a narrow pulse for the overshoot current is difficult.

DETAILED DESCRIPTION OF THE PRESENT INVENTION

The following invention is described with reference to the figures in which similar or the same numbers represent the same or similar elements. While this invention is described in terms for achieving the invention's objectives, it can be appreciated by those skilled in the art that variations may be accomplished in view of these teachings without deviation from the spirit or scope of the invention.

Figure 1:
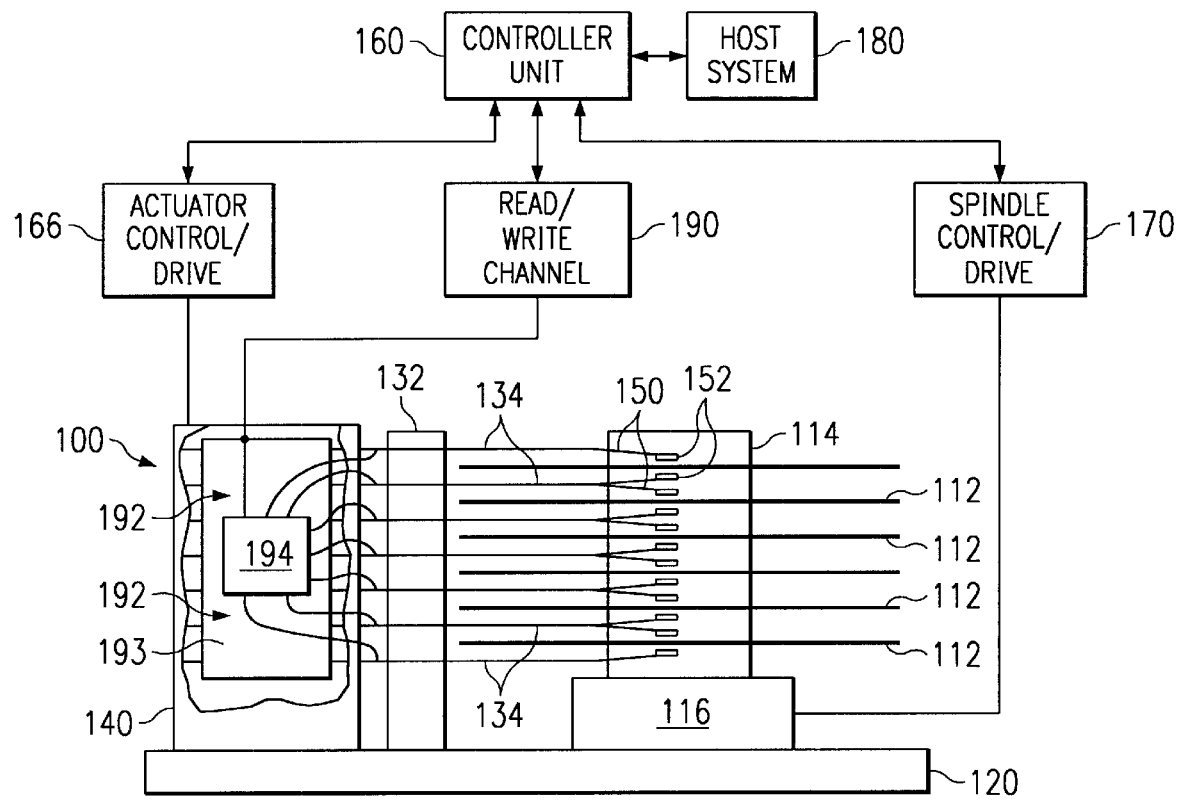
FIG. 1 is a side view of the disk drive system.
Figure 2:
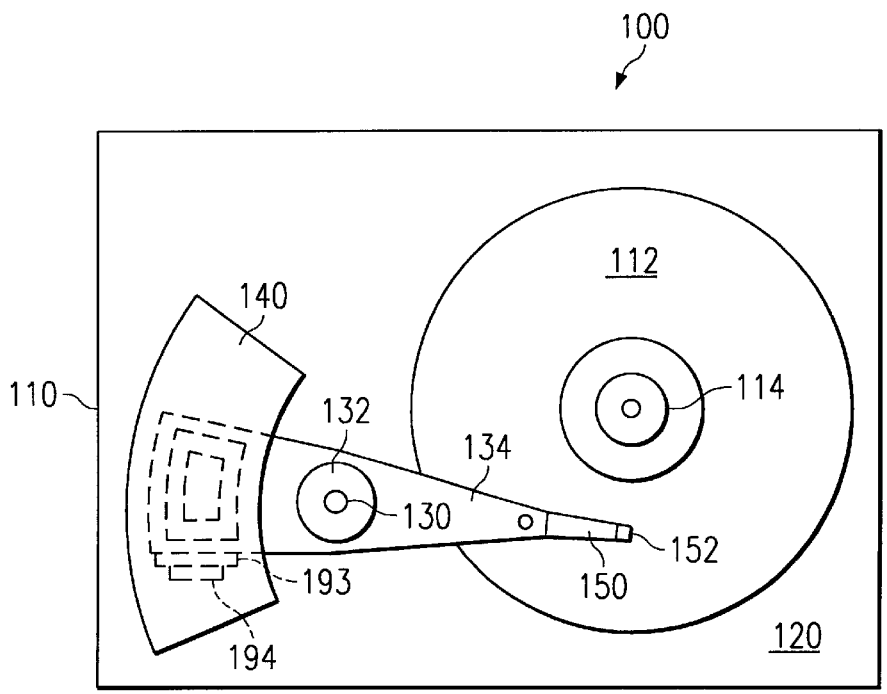
FIG. 2 is a top view of the disk drive system.
Figure 3:
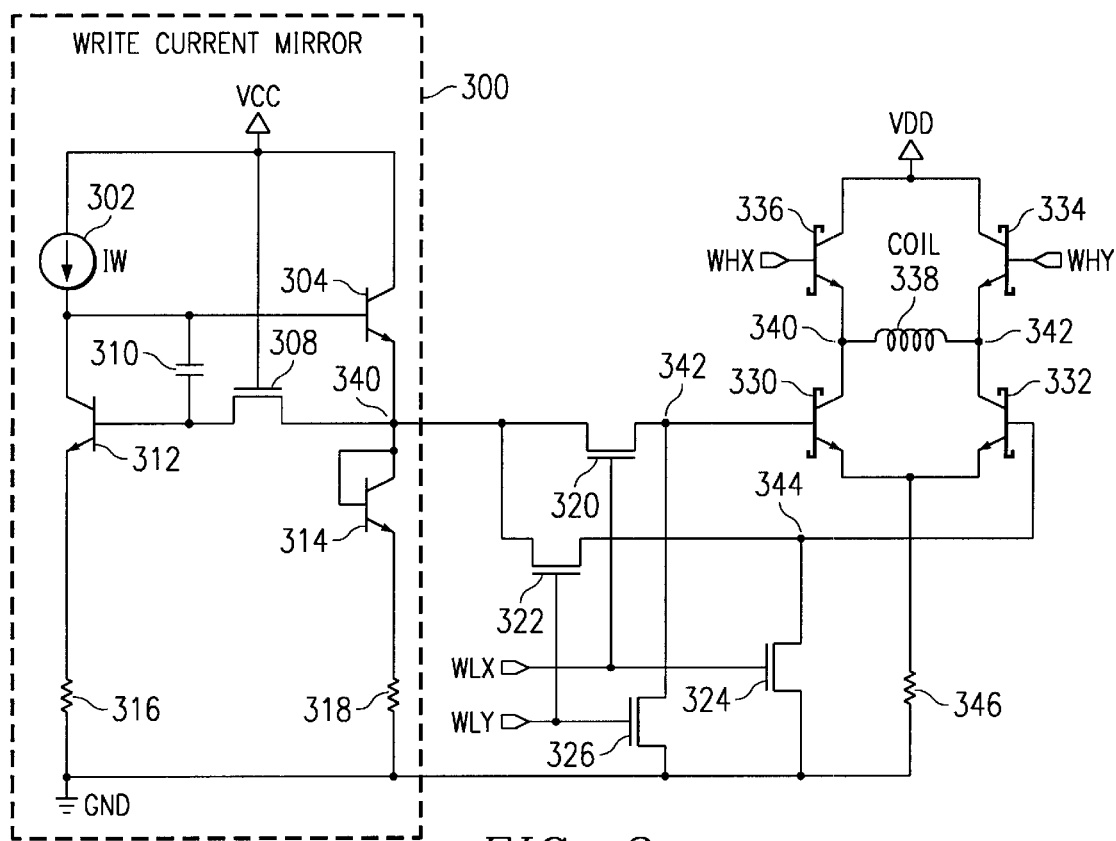
FIG. 3 is a circuit diagram of a write driver.

FIGS. 1 and 2 show a side and top view, respectively, of the disk drive system designated by the general reference 100 within an enclosure 110. The disk drive system 100 includes a plurality of stacked magnetic recording disks 112 mounted to a spindle 114. The disks 112 may be conventional particulate or thin film recording disk or, in other embodiments, they may be liquid-bearing disks. The spindle 114 is attached to a spindle motor 116 which rotates the spindle 114 and disks 112. A chassis 120 is connected to the enclosure 110, providing stable mechanical support for the disk drive system. The spindle motor 116 and the actuator shaft 130 are attached to the chassis 120. A hub assembly 132 rotates about the actuator shaft 130 and supports a plurality of actuator arms 134. The stack of actuator arms 134 is sometimes referred to as a "comb." A rotary voice coil motor 140 is attached to chassis 120 and to a rear portion of the actuator arms 134.

A plurality of head suspension assemblies 150 are attached to the actuator arms 134. A plurality of inductive transducer heads 152 are attached respectively to the suspension assemblies 150, each head 152 including at least one inductive write element. In addition thereto, each head 152 may also include an inductive read element or a MR (magneto-resistive) read element. The heads 152 are positioned proximate to the disks 112 by the suspension assemblies 150 so that during operation, the heads are in electromagnetic communication with the disks 112. The rotary voice coil motor 140 rotates the actuator arms 134 about the actuator shaft 130 in order to move the head suspension assemblies 150 to the desired radial position on disks 112.

A controller unit 160 provides overall control to the disk drive system 100, including rotation control of the disks 112 and position control of the heads 152. The controller unit 160 typically includes (not shown) a central processing unit (CPU), a memory unit and other digital circuitry, although it should be apparent that these aspects could also be enabled as hardware logic by one skilled in the computer arts. Controller unit 160 is connected to the actuator control/drive unit 166 which is in turn connected to the rotary voice coil motor 140. A host system 180, typically a computer system or personal computer (PC), is connected to the controller unit 160. The host system 180 may send digital data to the controller unit 160 to be stored on the disks, or it may request that digital data at a specified location be read from the disks 112 and sent back to the host system 180. A read/write channel 190 is coupled to receive and condition read and write signals generated by the controller unit 160 and communicate them to an arm electronics (AE) unit shown generally at 192 through a cut-away portion of the voice coil motor 140. The AE unit 192 includes a printed circuit board 193, or a flexible carrier, mounted on the actuator arms 134 or in close proximity thereto, and an AE module 194 mounted on the printed circuit board 193 or carrier that comprises circuitry preferably implemented in an integrated circuit (IC) chip including read drivers, write drivers, and associated control circuitry. The AE module 194 is coupled via connections in the printed circuit board to the read/write channel 190 and also to each read head and each write head in the plurality of heads 152. The AE module 194 includes the write driver circuit of the present invention.

Figure 4:
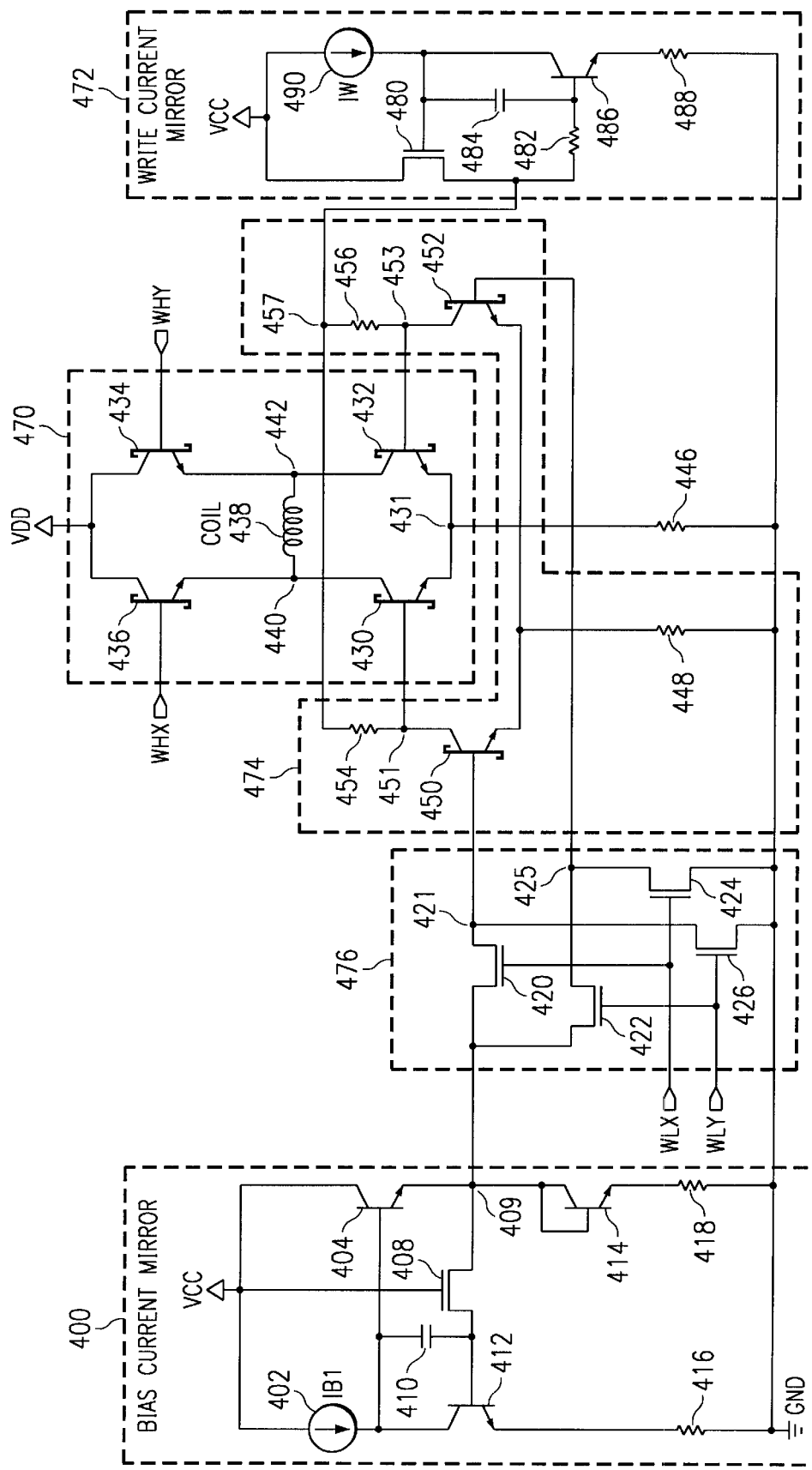
FIG. 4 is a circuit diagram of the write driver in accordance with the present invention.

Turning now to FIG. 4, an H-bridge circuit 470 is illustrated. The bias current mirror circuit 400 provides bias current to the H-bridge differential pair switch, transistor 450, transistor 452 and resistor 448. Current source 402 is connected to the collector of transistor 412. Additionally, the output of current generator 402 is connected to capacitor 410 and the base of transistor 404. The collector of transistor 404 is connected to the voltage $V_{CC}$. The emitter of transistor 412 is connected to resistor 416, and the base of transistor 412 is connected to capacitor 410 and the source of NFET 408. The gate of NFET 408 is connected to voltage $V_{cc}$ while the drain of NFET 408 is connected to the emitter of transistor 404 and the base and collector of transistor 414. The emitter of transistor 414 is connected to resistor 418. Both resistors 416 and 418 are connected to ground.

The differential pair switch circuit 474 includes transistor 450 and transistor 452, resistor 454, resistor 456, and resistor 448. The resistors 454 and 456 are connected together at the output of the write current mirror circuit 472. The resistor 454 is connected to the collector of transistor 450. The base of transistor 450 is connected to the drain of NFET 420. The emitter of transistor 450 is connected to resistor 448 and connected to the emitter of transistor 452. The base of transistor 452 is connected to the drain of NFET 422. The collector of transistor 452 is connected to resistor 456. The differential pair switch circuit 474 turns on and off the lower H-bridge transistors of H-bridge circuit 470. More specifically, transistor 430 and transistor 432 are turned on and off by the differential pair switch circuit 474. The H-bridge circuit 470 includes four transistors, namely transistors 430 and 432, which are the lower transistors of the H-bridge circuit 470. Additionally, the H-bridge circuit 470 includes upper transistors, namely transistors 436 and 434. Additionally, the H-bridge circuit includes a coil 438 connected between the emitters of transistor 436 and transistor 434 and across the collector of transistor 430 and transistor 432. The emitters of transistors 430 and 432 are connected together and connected to resistor 446. The collector of transistor 436 is connected to voltage $V_{DD}$ while the collector of transistor 434 is connected to voltage $V_{DD}$. A switch circuit 476 includes four NFET switches to switch the bias current from the bias current mirror circuit 400 to the differential pair switch circuit 474. The switch circuit 476 includes NFET 422, NFET 420, NFET 424 and NFET 426. A write current mirror circuit 472 is used to set up the coil current. The circuit includes NFET 480 having a drain connected to voltage $V_{CC}$. The gate of NFET 480 is connected to capacitor 484 and to the output of write current circuit 480. The source of transistor 480 is connected to resistor 482, and the other end of resistor 482 is connected to capacitor 484. Additionally, resistor 482 is connected to the base of transistor 486. The collector of transistor 486 is connected to the output of current source 490. The emitter of transistor 486 is connected to resistor 488, and the other end of resistor 488 is connected to ground.

The circuit of FIG. 4 operates as follows. The output of bias current mirror circuit 400 is at node 409. Node 409 is connected to two switches, represented by NFET 420 or NFET 422. NFET 420 and NFET 422 can be relatively small because they drive the bases of a low-current differential pair of transistors, namely transistor 450 and transistor 452. If NFET 420 is on, NFET 422 will be off, and node 409 will be connected to node 421 through NFET 420. Node 425 will be grounded because NFET 424 will be turned on. The voltage potential at node 421 is greater than the voltage potential at node 425, and therefore, transistor 450 is turned on and transistor 452 is off. Transistor 450 and transistor 452 are connected as a differential pair. The bias current of the differential pair is set by the current mirror configuration of transistor 412, transistor 450, and resistance 416 and resistance 448.

The bias current of the differential pair of transistor 450 and transistor 452 is set by the ratio of transistor 412 and transistor 450, and resistor 416 and resistor 448. The transistors 430 and 432 of the H-bridge circuit 470 are turned on and off by the potential difference between node 451 and node 453. This potential difference between nodes 451 and 453 can be quite small on the order of approximately 300 mV to fully turn on and off the H-bridge transistors 430 and 432.

The small potential difference now required to turn on and turn off transistors 430 and 432 decreases the slew rate required to control the H-bridge transistors, and consequently, the circuit speed of H-bridge circuit 470 is significantly improved. Transistor 450 and transistor 452 are a differential pair of transistors, and consequently, when the voltage at node 453 is higher than the voltage at node 451, transistor 432 will be on and transistor 430 will be off. The resistors 454 and 456 are connected to a common node point, namely node 457. The potential at node 451 is made lower than node 453 when transistor 450 is turned on and the bias current flows through resistance 454. The voltage at node 451, $V_{node\ 451} = V_{node\ 457} - [I_{RESISTANCE\ 448} \times \text{resistance } 454]$.

Since transistor 452 is off, the voltage of node 453 is close to node 457 since the only voltage drop between node 453 and node 457 across resistance 456 is from the base current of transistor 432. The voltage at node 457 is derived from the write current mirror from the output of the write current mirror circuit 472. In particular, the output is derived by transistor 486, NFET 480, resistance 482, resistance 488, and capacitor 484. Resistor 482 in the write current mirror circuit 472 offsets the output voltage of the write current mirror circuit 472 at node 457 to account for the base current drop across resistance 456. The master current IW is mirrored through transistor 432 and resistance 446. The ratio of transistor 432 and transistor 486 and resistance 488 and 446 determines the coil current. The coil current is approximately equal to the current through resistance 446.

Because of the differential circuit formed by transistors 450 and 452, the voltage at nodes 451 and 453 can be controlled by sourcing or sinking current into these nodes. By changing the voltage at node 451 or node 453, the coil current can be accurately varied. One side of resistor 446 at node 431 is connected to the emitter of transistor 430 and transistor 432. The voltage at node 431 will follow the voltage at the base of the "on" transistor of the H-bridge circuit 470. In this case, the voltage at node 431 follows node 453. If the voltage at node 453 were to increase or decrease, then the voltage at node 431 would increase or decrease correspondingly. Furthermore, the coil current would increase or decrease. The ability to control the coil current by changing the voltage at node 451 and node 453 allows the circuit to control the coil current overshoot and undershoot.

Figure 5:
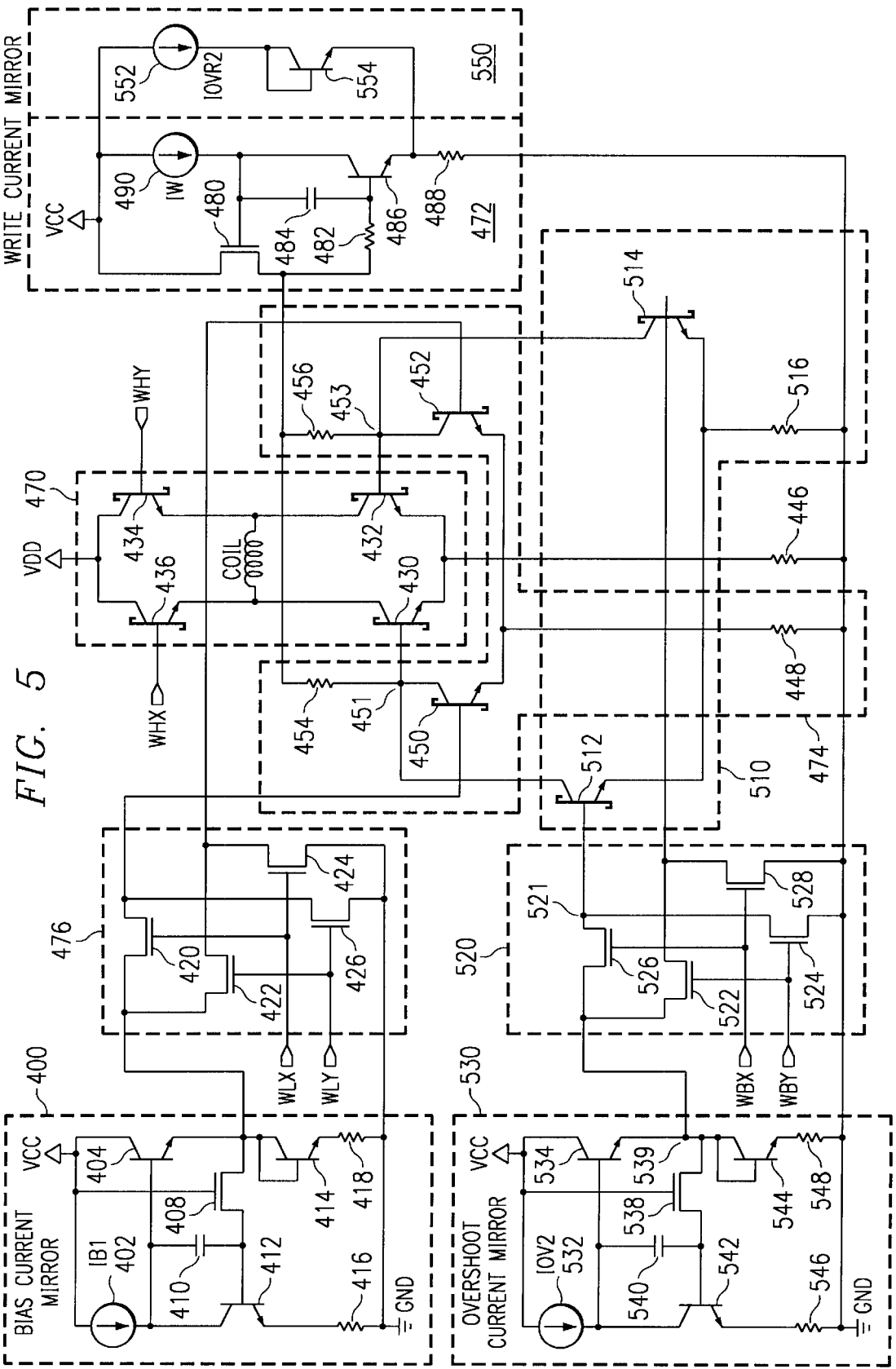
FIG. 5 is an additional circuit diagram of the write driver in accordance with the present invention.

Turning now to FIG. 5, an overshoot current mirror circuit 530 includes a current source 532 and a bipolar transistor 534, which includes a collector connected to voltage $V_{CC}$ and the current source 532. A base of transistor 534 is connected to the other end of current source 532. An emitter of transistor 534 is connected to a drain of NFET 538. The gate of NFET 538 is connected to voltage $V_{CC}$. The source of NFET 538 is connected to the base of bipolar transistor 542. In addition, the source of NFET 538 is connected to capacitor 546. Capacitor 546 is connected to the base of transistor 534. A bipolar transistor 544 has its base connected to its collector, and this common base and collector connection is connected to node 539 which in turn is connected to the drain of NFET 538. The emitter of transistor 544 is connected to resistor 548. The other end of resistor 548 is connected to ground. The emitter of transistor 542 is connected to resistor 546. The other end of resistor 546 is connected to ground. In addition, a second switching circuit 520 is connected to node 539. This second switching circuit 520 includes NFET 526. The source of NFET 526 is connected to node 539. Additionally, connected to node 539 is the source of NFET 522. The gate of NFET 526 is connected to the gate of NFET 528 which are commonly connected to receive the signal WBX. The drain of NFET 526 is connected to the base of bipolar transistor 512. The drain of NFET 522 is connected to the base of bipolar transistor 514. The drain of NFET 526 is connected to the drain of NFET 524. The gate of NFET 524 is connected to the gate of NFET 522 which are commonly connected to receive input signal WBY. The source of NFET 524 is connected to ground.

Additionally, the circuit of FIG. 5 includes an overshoot differential pair circuit 510 including bipolar transistor 512, bipolar transistor 514, and resistor 516. The emitter of transistor 512 and the emitter of transistor 514 are commonly connected to a resistor 516. The other end of resistor 516 is connected to ground. The collector of transistor 514 is connected to node 453, and the collector of transistor 512 is connected to node 451.

Additionally, the write mirror current circuit 472 is connected to the master current circuit 550. The master current circuit 550 includes a bipolar transistor 554 having its base connected to the collector and a current generator 552. The commonly connected base and collector of transistor 554 is connected to the output of current generator 552. The input to the current generator 552 is connected to the voltage $V_{CC}$. The emitter of transistor 554 is connected between the emitter of transistor 486 and resistor 488.

Figure 6:
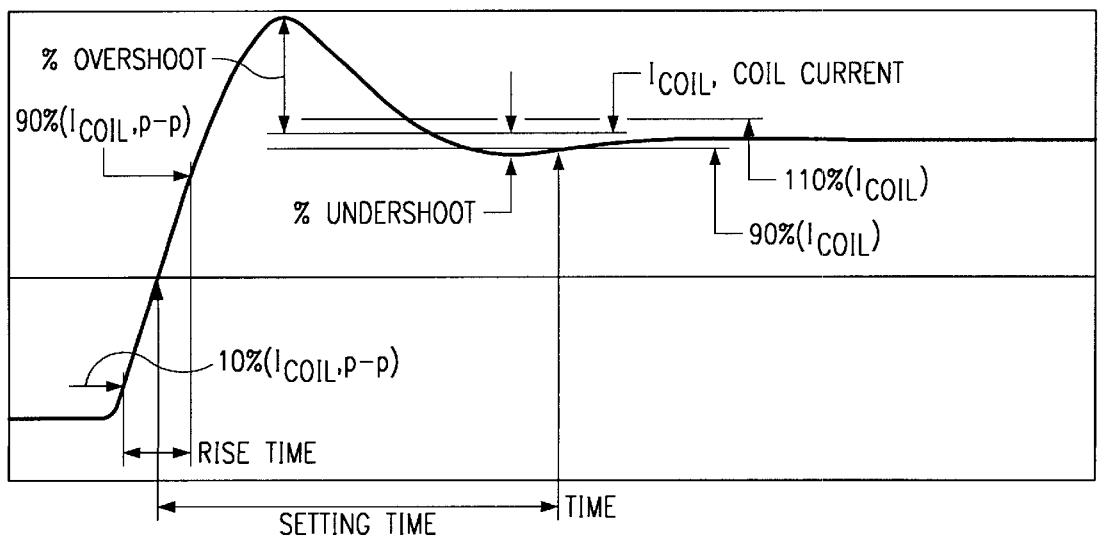
FIG. 6 is a coil current waveform diagram.

At steady state, the current through the coil is equal to the write current of the current generator 490, namely current IW. When the write signals toggle or change (namely the write signals WLX, WLY, WHX, WHY), the coil current is equal to the write current and the overshoot current. A short delay period after the write signals have toggled, the overshoot current signals (namely WBX, WBY) will toggle or change which will cause the overshoot current to turn off. This is illustrated in FIG. 6. The delay circuitry for the overshoot signals is not shown.

The overshoot current is controlled as follows. The coil driver circuit of FIG. 5 includes three current mirrors, a bias current mirror circuit 400, an overshoot current mirror circuit 530, a write current mirror 472, and a differential current circuit 510. The output of the bias current mirror circuit 400 at node 409 is connected to the differential pair transistor 450 and transistor 452 through NFETs 420 and 422, respectively. NFET 420 and NFET 422 are controlled by input signals WLX and WLY. The output of the overshoot current mirror circuit 530 at node 539 is connected to a differential pair of transistors, namely bipolar transistor 512 and bipolar transistor 514. Bipolar transistor 512 is controlled by NFET 526, and bipolar transistor 514 is controlled by NFET 522. The NFET 526 is controlled by the signal WBX while the NFET 522 is controlled by the signal WBY. The output of the write current mirror circuit 472 at node 457 is set to a voltage determined by the current source 490 and the current source 552. The current output from the current source 552 in the circuit 550 and the current output from the current source 532 of the overshoot current mirror circuit 530 are proportional to each other and are adjusted at the same rate. For example, the output of the current from the current source 552 may be 2.5 times larger than the current output from the current source 532. Both sources of current 532 and 552 are adjustable in that the output from the current sources are adjustable to adjust the amount of overshoot current. The current from current source 490 is adjustable to control the amount of write current.

At steady state, assume the current is flowing from transistor 436 through the coil to transistor 432. Thus, transistors 436 and 432 are on while transistors 434 and 430 are off. Transistor 432 is on because the voltage at node 453 is higher than the voltage at node 451. Transistor 452 is off and transistor 450 is on. Transistor 450 is on because the NFET 420 is on, supplying a logical "1" signal to the base of transistor 450. Transistor 452 is off because NFET 422 is off due to a "0" WLY signal. At this time, transistor 514 is on and transistor 512 is off. Transistor 514 is on because NFET 522 is on by a logical "1" at the WBY signal. Transistor 512 is off because NFET 526 is off by a logical "0" WBX signal. Notice that when transistor 450 is on, the base of transistor 450 is connected to the output of the bias current mirror circuit 400 at node 409 because NFET 420 is on. Also, transistor 514 is on and the base of transistor 514 is connected to the output of the overshoot current mirror circuit 530 at node 539. The current through transistor 514 is determined by the current mirror action between transistor 542 and resistor 546, and transistor 514 and resistor 516. The current through transistor 514 is proportional to the output of current source 532. The current through transistor 450 is determined by the current mirror action between transistor 412 and resistor 416, and transistor 450 and resistor 448.

The current through transistor 432 is determined by the current mirror action between transistor 432 and resistor 446, and transistor 486 and resistor 488, and by the voltage drop produced across resistor 456 by the collector current of transistor 514. Neglecting the voltage drop of the current through transistor 514 and resistor 456, the collector current of transistor 432 will be a multiple of IW+IOVR2 due to the write current mirror circuit 550. If the transistor ratio of transistor 432 and transistor 486 is chosen to be 20×, and the resistor ratio of resistor 446 and resistor 488 is 20×, then the collector current of transistor 432 will be 20×(IW+IOVR2). This current is the write current+the overshoot current. However, the voltage drop across resistor 456, which is 1×resistance of resistor 456, is chosen to be equal to IOVR2× resistor 488, and therefore, the collector current of transistor 432 is reduced by 20×IOVR2. Notice that the current of transistor 514 is derived by the overshoot current mirror circuit 530, which has a master current, IOVR, which is proportional to IOVR2.

The current through transistor 450 is proportional to the current output from the current source 402. The current output from current generator 552 could have been added to the current generator 490, but having two separate current generators, namely current generators 552 and 490, improves the accuracy of the steady state coil current. The density current of transistor 486 must be equal to the current density of transistor 432. If the output of the current generator 552 were added to the current generator 490, then the current density of transistor 486 would be greater than the current density of transistor 432 which creates an inaccurate write coil current. Therefore, the output of current generator 552 is summed into resistor 488 by the connection to the emitter of transistor 486. This keeps the steady state write coil current accurate also.

A "beta" helper transistor 480 was chosen to be an NFET rather than a bipolar transistor. This improves the accuracy of the write current mirror circuit 472. NFET 480 sources both the bias current of differential pair, transistor 450 and transistor 452, and the overshoot current of differential pair, transistors 512 and 514. If an NPN beta helper transistor were used, the base current of the NPN transistor could be significant to the output of the current generator 490 and result in an inaccurate reduction of the steady state coil current.

The H-bridge transistor 432 is complemented by transistor 430. The voltage at node 451 is chosen to be lower than the voltage at node 453 so that transistor 430 remains off. Resistors 454 and 456 are substantially equal and connected to the same node, namely node 457, the output of the write current mirror circuit 472. Therefore, the voltage drop across resistor 454 must be greater than the voltage drop across resistor 456 to keep transistor 430 off. As previously discussed, the voltage drop across resistor 456 is I (transistor 514)×the resistance of resistor 456. The current following through resistor 454 is the collector current of transistor 450. This current is determined by the current mirror action of transistor 450 and resistor 448, and transistor 412 and resistor 416. The collector current of transistor 450 is proportional to the output of the current generator 402 of the bias current mirror circuit 400. If the collector current of transistor 450 is greater than the collector current of transistor 514, then the voltage at node 451 will be less than the voltage at node 453. H-bridge transistor 430 will be turned off.

Next, the direction of coil current will be reversed so that the current flows through transistor 434 and transistor 430. Transistors 436 and 432 will be off. This is accomplished by toggling signals WLX, WLY and WHX, WHY. Signals WBX, WBY will not toggle immediately but will be delayed by a delay circuit (not shown), and the delay period determines the duration of the coil overshoot current.

Immediately after signal transition, H-bridge transistors 434 and 430 will turn on. Likewise, transistors 436 and 432 will turn off. Signal WLY is a logical "1" which turns NFET 422 on which turns transistor 452 on. Also, signal WLX is a logical "0" which turns off NFET 420. This turns transistor 450 off. Note that signals WBX, WBY have not made a transition, and therefore, the state of transistor 512 and transistor 521 has not been changed. The WBX/Y delay is typically between 0.5 ns to 5 ns. Transistor 512 is turned off, and transistor 514 is on. Therefore, the collector current of transistor 430 will be proportional (approximately 20 times) to the output of the current generating circuit 490 and the current generating circuit 552. In other words, the coil current is equal to the write current plus overshoot current. This allows control of the overshoot current to a predetermined or programmed value. By control of the voltage at the base of transistor 430 at node 451, the overshoot current is controlled.

On the other side of the H-bridge, transistor 452 and transistor 514 are on. Therefore, the voltage drop across resistor 456 is produced by the current from current mirror action of the transistor 452 and current from the overshoot mirror produced by transistor 514. The voltage at node 453 is lower than the voltage at node 451 and, as a consequence, transistor 432 is turned off.

After the delay period defined by the delay circuit has expired, typically between 0.5 ns to 5 ns, the signal WBX will become a logical "1" and NFET 526 will turn on, and transistor 512 will turn on. Also, signal WBY will become a logical "0" and NFET 522 will turn off, and transistor 514 will turn off. The voltage drop across resistor 454 is decreased due to the collector current of transistor 512 (which is proportional to the overshoot current mirror) which will decrease the collector current of transistor 430 to a steady state write value. Thus, the H-bridge circuit is in a steady state condition again.

Figure 7:
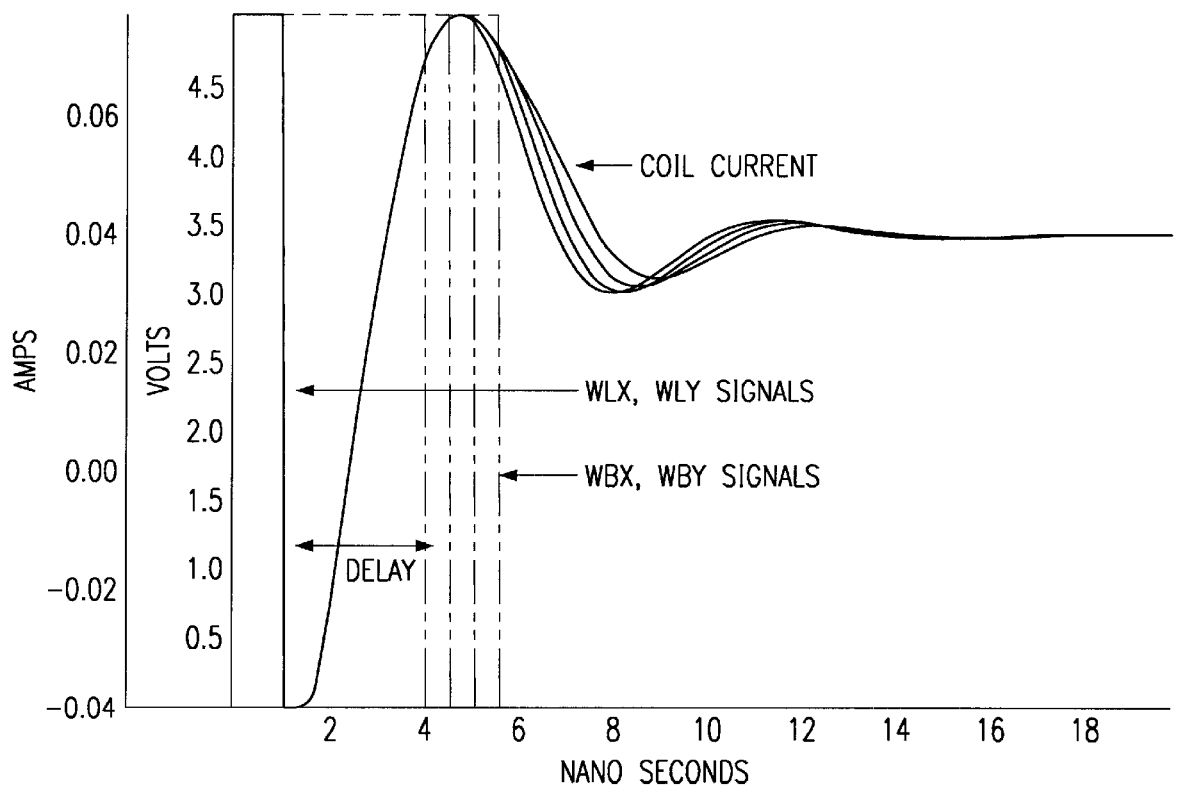
FIG. 7 is a coil current waveform diagram showing H-bridge control signals.

FIG. 7 shows the overshoot current adjustments for different delay periods through a diagram of coil current waveform, showing H-bridge control signals.

Figure 8:
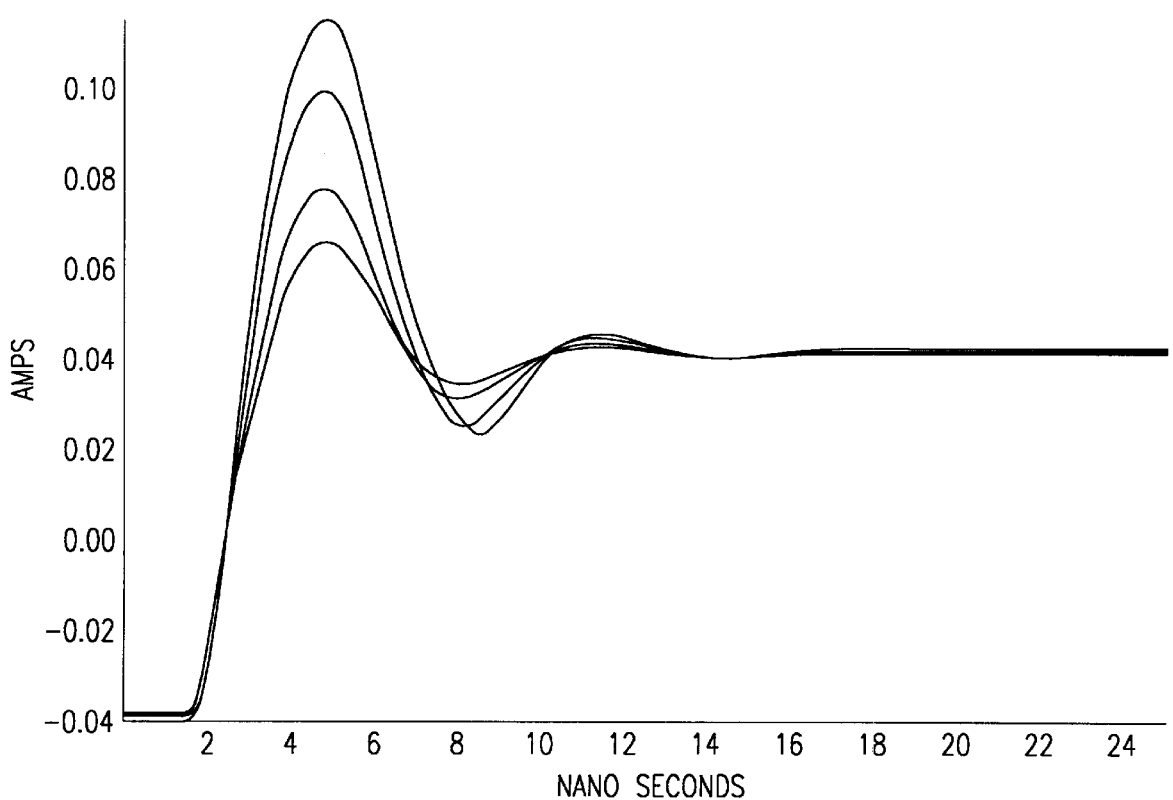
FIG. 8 is a coil current waveform diagram showing adjustments to coil boost current.

FIG. 8 is a diagram of coil current waveform showing adjustments to coil boost current.

What is claimed is:

1. A write driver for controlling a current path through an inductive load, comprising:
   an H-bridge circuit for supplying said current through said inductive load;
   a current circuit to generate said current for said current path; and
   a differential pair switch to control said H bridge circuit by switching on and off in a first position when said current path is switched and a second position after said current path has been switched, wherein said write driver further comprises a bias current circuit to bias said differential pair switch.

2. A write driver for controlling a current path for an inductive load as in claim 1, wherein said differential pair switch includes a pair of bipolar transistors.

3. A write driver for controlling a current path for an inductive load as in claim 1, wherein said differential pair switch adjusts a voltage at a first voltage between two transistors of said differential pair switch and wherein said differential pair switch adjusts said voltage at a second voltage between two transistors.

4. A system for reading and writing information on a disk, comprising:
   a read/write circuit for reading and writing data on a disk;
   a preamplifier for amplifying the data read from disk;
   a read channel for conditioning the data; and
   a controller for communicating with a host system, wherein said read/write circuit includes:
   an H-bridge circuit for supplying said current through said inductive load;
   a current circuit to generate said current for said current path, said current circuit including CMOS devices; and
   a differential pair switch to control said H bridge circuit by switching on and off in a first position when said current path is switched and a second position after said current path has been switched, wherein said write driver further comprises a bias current circuit to bias said differential pair switch.

5. A H-bridge circuit as in claim 4, wherein said lower H-bridge circuit is bipolar.

6. An H-bridge circuit as in claim 4, wherein said lower H-bridge circuit is CMOS.

7. An H-bridge as in claim 4, wherein a differential pair is used to control lower H-bridge transistors.

8. An H-bridge circuit as in claim 7, wherein said differential pair is bipolar.

9. An H-bridge circuit as in claim 8, wherein said differential pair is CMOS.

* * * * *